C. S. SCHROEDER.
CONTROLLER FOR ELECTRIC CIRCUITS.
APPLICATION FILED MAY 8, 1920.
1,433,237.
Patented Oct. 24, 1922.
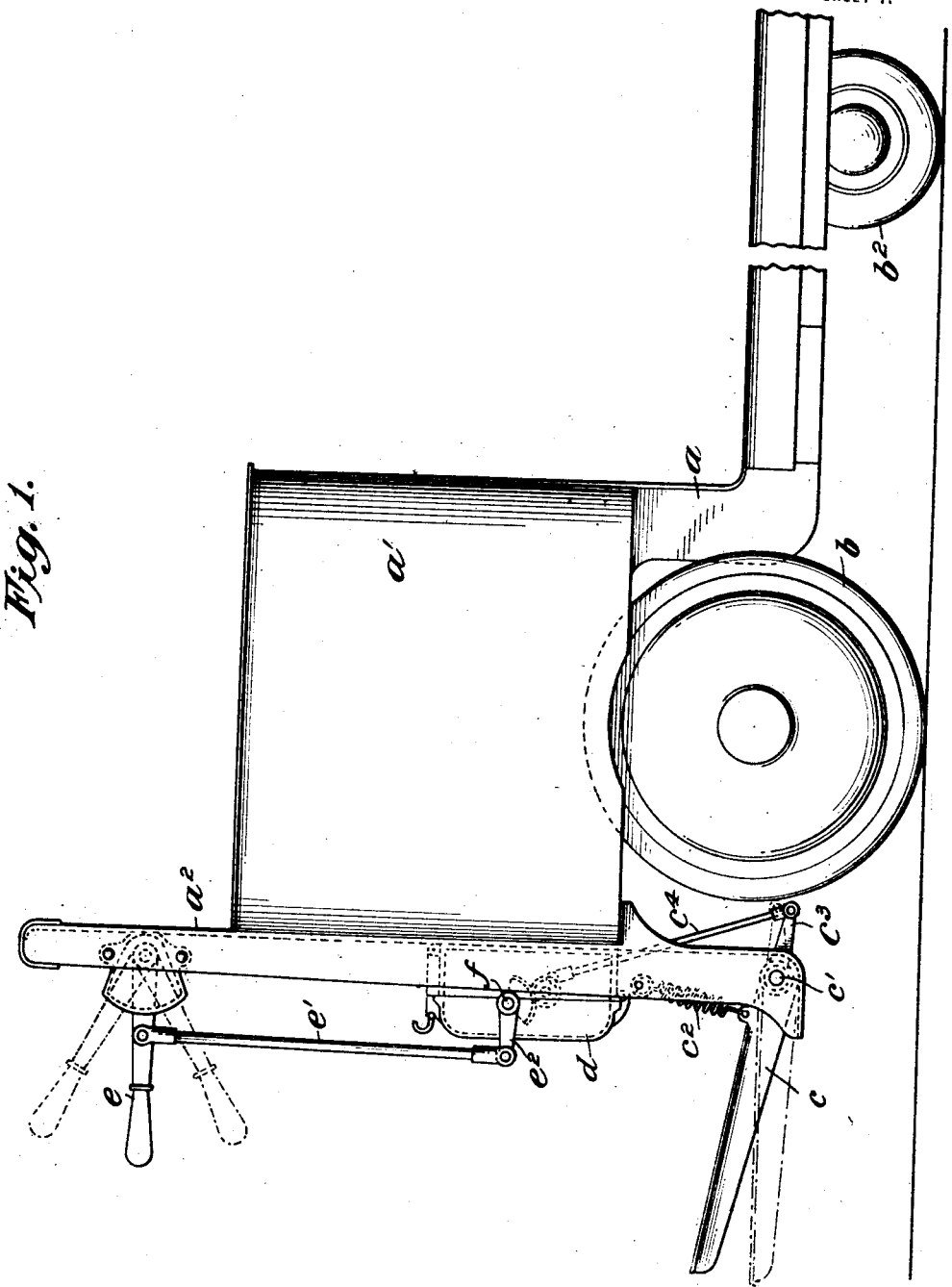

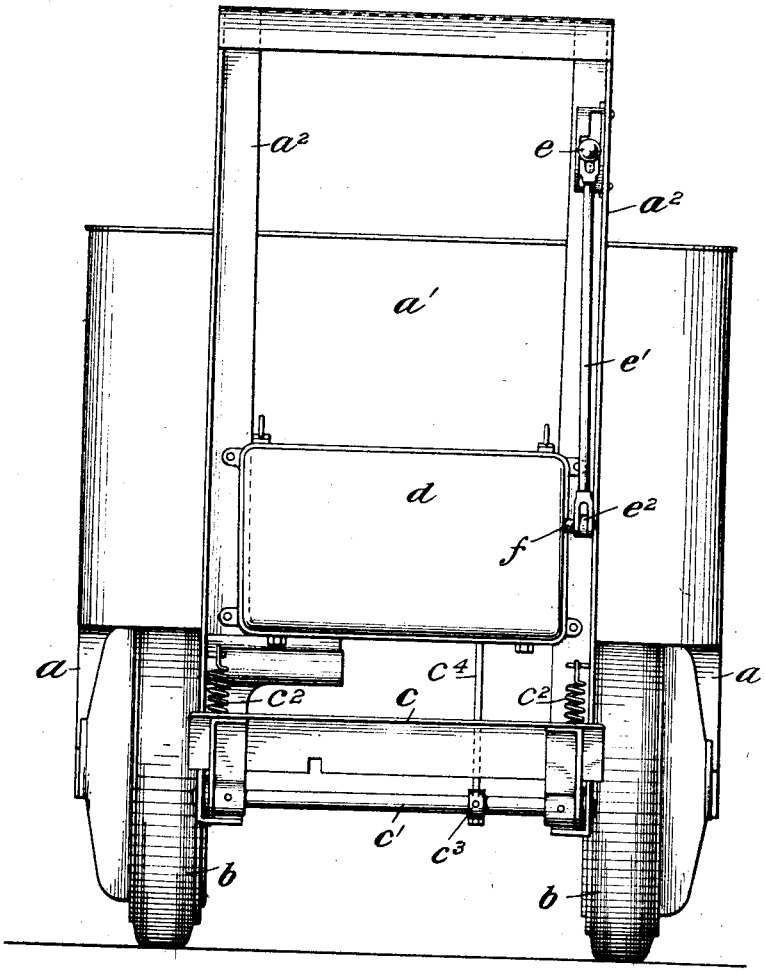

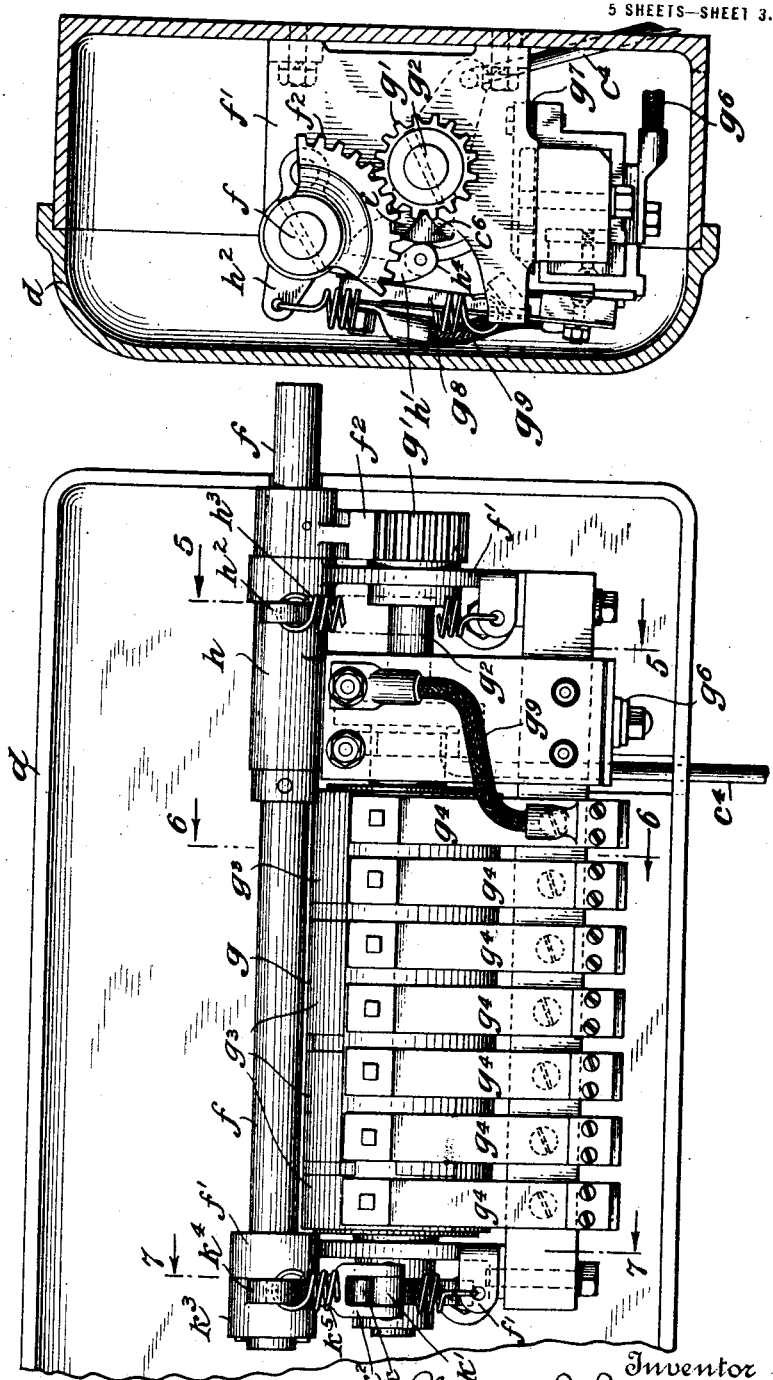

C. S. SCHROEDER.
CONTROLLER FOR ELECTRIC CIRCUITS.
APPLICATION FILED MAY 8, 1920.
1,433,237.
Patented Oct. 24, 1922.
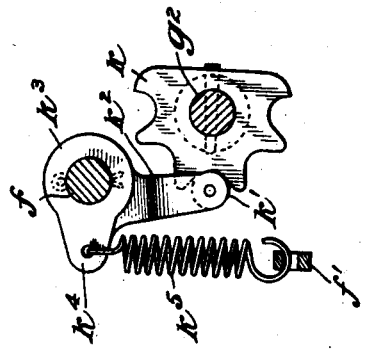
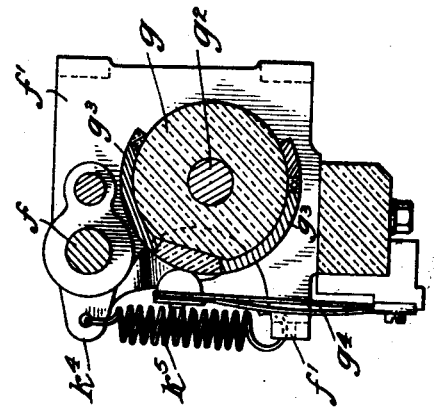
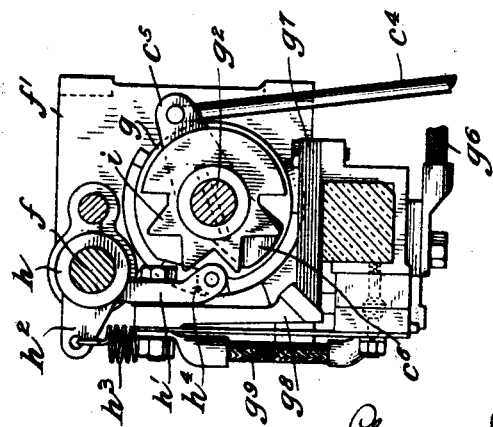

C. S. SCHROEDER.
CONTROLLER FOR ELECTRIC CIRCUITS.
APPLICATION FILED MAY 8, 1920.

1,433,237.

Patented Oct. 24, 1922.

Patented Oct. 24, 1922.

1,433,237

UNITED STATES PATENT OFFICE.

CHARLES S. SCHROEDER, OF NEW YORK, N. Y., ASSIGNOR, BY MESNE ASSIGNMENTS, TO THE YALE & TOWNE MANUFACTURING COMPANY, OF STAMFORD, CONNECTICUT, A CORPORATION OF CONNECTICUT.

CONTROLLER FOR ELECTRIC CIRCUITS.

Application filed May 8, 1920. Serial No. 379,774.

*To all whom it may concern:*

Be it known that I, CHARLES S. SCHROEDER, a citizen of the United States, residing in the borough of Richmond, of the city of New York, in the State of New York, have invented certain new and useful Improvements in Controllers for Electric Circuits, of which the following is a specification, reference being had to the accompanying drawings, forming a part hereof.

This invention has been developed with particular reference to the control of the electric circuits of electrically driven motor trucks such as are commonly employed on railway platforms and shipping piers and in industrial establishments for the handling of freight and heavy commodities. It has for its objects to prevent the arcing of the current at the contacts of the controller drum and to provide an improved automatic cut-out which shall operate to cut off current from the motor whenever the driver steps from the driver's platform. To attain the first mentioned object means are provided whereby the circuit between the storage battery and the motor shall be interrupted at a point other than at the controller contact, whenever a change in speed or direction necessitates a shifting of the contacts on the controller drum before any such change is made. The second named object is attained by providing connections from the driver's platform or brake pedal whereby the current is interrupted when the driver steps from the platform or releases the brake pedal or lever. Although the invention has been developed with particular reference to its use as stated, it will nevertheless be apparent that the invention, especially with respect to the prevention of arcing at the contacts of the controller drum, is capable of use for other specific purposes. The invention will be more fully explained hereinafter with reference to the accompanying drawings in which it is illustrated and in which—

Figure 1 is a view in side elevation of a motor driven, freight handling truck to which the invention is applied, the parts involved in the control of the motor being shown in the positions which they assume when the truck is at rest and the driver has stepped from his platform.

Figure 2 is a view of the same in front elevation.

Figure 3 is a view in front elevation of the controller in its casing, the front or cover of the casing being removed.

Figure 4 is a view of the same in end elevation, as seen from the right hand in Figure 3, with the casing in section.

Figures 5, 6 and 7 are detail views in section on the planes indicated by the lines 5—5, 6—6 and 7—7, respectively, of Figure 3.

Figure 8:
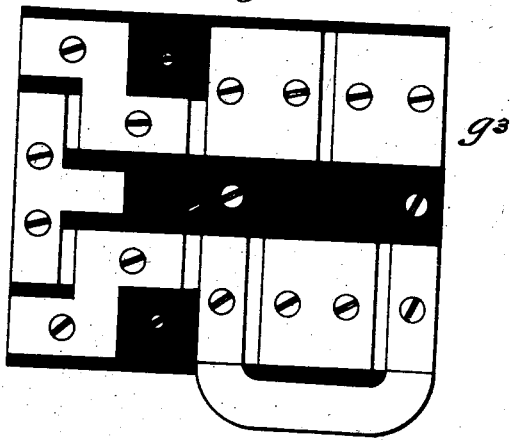

Figure 8 is a development of the contacts of a portion of the controller drum.

Figure 9:
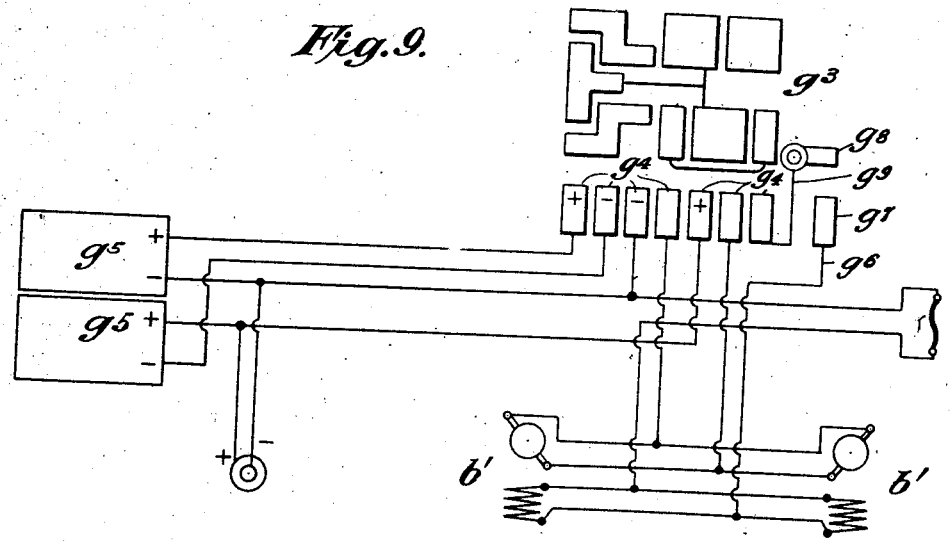

Figure 9 is a diagrammatic representation of the wiring system.

The truck which has been chosen for illustration of one application of the invention may have a suitable body $a$, with a main casing $a'$ to receive and support the storage battery which supplies current for the propulsion of the truck, combined driving and steering wheels $b$, each of which embodies a suitable motor, the field and armature coils of which are indicated at $b'$ in Figure 9, and carrying wheels $b^2$. Secured to the main frame $a$ and casing $a'$, at the front of the latter, is an auxiliary frame $a^2$ which supports at its lower end the driver's platform $c$, pivoted at $c'$ and raised by springs $c^2$, when the driver steps from the platform, from the position indicated by broken lines in Figure 1 to the position indicated by full lines, a controller casing $d$ and a controller handle $e$. The steering handle and its connections, with which the present invention is in no wise concerned, are not shown. An arm $c^3$, of the driver's platform is connected by a link $c^4$ to the controller mechanism, as hereinafter described, and the controller lever $e$ is connected by a link $e'$ to an arm $e^2$ secured on the operating shaft $f$ of the controller mechanism.

The shaft $f$ is mounted in suitable bearings in the frame $f'$ of the controller mechanism and has secured thereon a gear segment $f^2$ which meshes with a pinion $g'$ on the shaft $g^2$ of the controller drum $g$, the shaft $g^2$ being mounted in suitable bearings in the frame. The drum $g$ carries in usual manner a series of contacts or terminals indicated in development in Figure 8 and in diagram in Figure 9, arranged to co-operate with a series of spring contacts or brushes $g^4$ which, as shown in diagram in Figure 9, are suitably connected to the battery, indicated at $g^5$, and the motor coils, indicated at $b'$, so as to produce the required speeds ahead and in reverse. Such wiring connections are common in the art and need not be described herein. As indicated in Figures 3, 4 and 5, current is supplied to the terminals of the controller drum and the brushes $g^4$ through a conductor $g^6$, a laminated cut-out terminal $g^7$, a movable terminal $g^8$ and a flexible conductor $g^9$. Current is therefore supplied to the controller, for all positions, through the cut-out switch formed by the terminals $g^7$, $g^8$, which may be of such character as to resist the tendency to arcing. By interrupting the current at the cut-off switch $g^7$, $g^8$, prior to each change in position of the controller drum, arcing at the controller contacts is prevented. The means by which this is accomplished will now be described.

The contact $g^8$ is carried by an arm $h'$ of a sleeve $h$ which is mounted loosely on the shaft $f$ and has an arm $h^2$ to which is connected one end of a spring $h^3$, the other end of which is connected to the frame $f'$. The terminal $g^8$ is therefore held normally in contact with the terminal $g^7$. A roller $h^4$, carried by the arm $h'$, stands in the path of the teeth of a star wheel $i$, which has a number of teeth equal to the number of different positions of the controller drum and is secured to the shaft $g^2$ of the drum so as to oscillate therewith. The teeth of the star wheel or cam wheel $i$ are properly placed with respect to the contacts of the drum so that in the movement of the drum, at the time when the electrical relation of the contacts $g^3$ and the brushes $g^4$ is changed, the corresponding tooth of the star wheel or cam wheel $i$ acts upon the roller $h^4$ and arm $h'$ to move the terminal $g^8$ away from the terminal $g^7$ and thereby interrupt the current before the contact on the drum leaves the brush. Arcing at the contacts of the controller drum is therefore prevented.

For the purpose of insuring proper movement of the drum $g$ there is also fixed to the shaft $g^2$ a toothed detent wheel $k$ which cooperates with a roller $k'$ carried by an arm $k^2$ on a sleeve $k^3$ which is mounted on the shaft $f$. An arm $k^4$ of the sleeve $k^3$ has secured thereto one end of a spring $k^5$, the other end of which is connected to the frame $f'$.

For the purpose of interrupting the circuit at the switch $g^7$, $g^8$ whenever the driver's weight is removed from the platform $c$ and the platform is raised by the springs $c^2$, the arm $c^3$ of the platform is connected by the link $c^4$ to an arm $c^5$ of a cam $c^6$ which is pivoted on the shaft $g^2$ and is arranged to act against the arm $h'$, whenever the platform assumes the position indicated by full lines in Figures 1, to swing the terminal $g^8$ away from the terminal $g^7$ and thereby interrupt the current regardless of the position of the controller drum.

The mode of operation of the several features of the invention will be understood readily without further explanation. It will also be understood that various changes in details of construction and arrangement can be made to suit different conditions of use or the convenience of the manufacturer and that the invention, therefore, is not restricted to the precise construction shown and described therein except as pointed out in the accompanying claims.

I claim as my invention:

1. In an electric circuit controller, the combination with a controller drum having contacts and brushes for cooperation with said contacts, of a cut-out in the controller circuit, means controlled by movement of the controller drum to open said cut-out, and independent mechanical means cooperable with said cut-out for opening the same regardless of the position of the drum contacts relatively to the brushes.

2. In an electric circuit controller, the combination with a controller drum having contacts and brushes to cooperate with said contacts, of a cut-out in the controller circuit comprising fixed and movable members, means controlled by movement of the controller drum to move the movable member of the cut-out to open the latter, means for closing the cut-out, and mechanical means independent of the controller drum for moving the movable member of the cut-out to open the latter regardless of the position of the drum contacts relatively to the brushes.

3. In an electric circuit controller, the combination with a controller drum having contacts, and brushes to cooperate with said contacts, of a cut-out included in the controller circuit, said cut-out comprising a movable member and a fixed member, an arm secured to the movable member of the cut-out, a spring tending to force the said movable member toward the fixed member of the cut-out, a movable arm to cooperate with the arm to which said movable cut-out member is secured to open said cut-out regardless of the position of the drum contacts relatively to the brushes, and mechanical means independent of the controller drum for operating said movable arm.

This specification signed this 7th day of May A. D. 1920.

CHARLES S. SCHROEDER.